(12) United States Patent
Ding et al.

(10) Patent No.: US 10,205,617 B2
(45) Date of Patent: Feb. 12, 2019

(54) CIRCUITS AND METHODS FOR REDUCING THE AMPLITUDE OF COMPLEX SIGNALS

(71) Applicant: Texas Instruments Incorporated, Dallas, TX (US)

(72) Inventors: Lei Ding, Plano, TX (US); Rahmi Hezar, Allen, TX (US); Zigang Yang, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 757 days.

(21) Appl. No.: 13/949,345

(22) Filed: Jul. 24, 2013

(65) Prior Publication Data

US 2015/0030099 A1 Jan. 29, 2015

(51) Int. Cl.
 *H04L 27/26* (2006.01)

(52) U.S. Cl.
 CPC .............................. *H04L 27/2623* (2013.01)

(58) Field of Classification Search
 CPC ..... H04L 27/34; H04L 27/38; H04L 27/3488; H04L 27/362; H04L 1/0041; H04L 1/0071
 USPC ............................................................ 375/269
 See application file for complete search history.

(56) References Cited

U.S. PATENT DOCUMENTS

| | | | |
|---|---|---|---|
| 2003/0054851 A1* | 3/2003 | Jo et al. ......................... | 455/522 |
| 2006/0120479 A1* | 6/2006 | Cai et al. ....................... | 375/296 |
| 2008/0150625 A1* | 6/2008 | Sundstrom ..................... | 327/551 |
| 2008/0304594 A1* | 12/2008 | Schell et al. ................... | 375/300 |
| 2012/0300824 A1* | 11/2012 | Maehata et al. ............... | 375/224 |
| 2012/0321014 A1* | 12/2012 | Maehata et al. ............... | 375/295 |

\* cited by examiner

*Primary Examiner* — Juan A Torres
(74) *Attorney, Agent, or Firm* — Andrew Viger; Charles A. Brill; Frank D. Cimino

(57) ABSTRACT

For crest factor reduction in a first signal having first and second components, the first component is delayed. A second signal is generated in response to detecting that a peak in the first component exceeds a predetermined threshold. Amplitude of the peak in the first component is reduced in response to detecting that the peak in the first component exceeds the predetermined threshold. Reducing amplitude of the peak in the first component includes adding the second signal to the delayed first component.

23 Claims, 2 Drawing Sheets

CIRCUITS AND METHODS FOR REDUCING THE AMPLITUDE OF COMPLEX SIGNALS

BACKGROUND

Many modulation schemes generate I and Q components from complex signals. The I and Q signals are phase shifted relative to each other. For example, the I and Q signals may be orthogonal. The I and Q components may be amplified by power amplifiers. In order to improve efficiency of the power amplifiers, the combined I and Q amplitude is reduced at the baseband using crest factor reduction (CFR) techniques. In summary, crest factor reduction reduces or suppresses peaks in amplitudes of the complex signals.

Some modulation schemes, such as time-interleaved pulse width modulation and spatially combined IQ modulation, use amplifiers that are peak constrained by amplitudes of the individual I and Q components and not amplitudes of the combined I and Q signals. Traditional crest factor reduction, which reduces the combined I and Q amplitude, does not yield optimal power amplification output power and efficiency when used with these modulation schemes.

SUMMARY

For crest factor reduction in a first signal having first and second components, the first component is delayed. A second signal is generated in response to detecting that a peak in the first component exceeds a predetermined threshold. Amplitude of the peak in the first component is reduced in response to detecting that the peak in the first component exceeds the predetermined threshold. Reducing amplitude of the peak in the first component includes adding the second signal to the delayed first component.

DETAILED DESCRIPTION

The circuits and methods disclosed herein perform crest factor reduction independently on I and Q signal components of a complex signal using independent signal paths. The complex signal is sometimes referred to as the first signal. Crest factor reduction reduces amplitude of the I and Q components of a complex signal. The independent crest factor reduction provides for more efficient and greater power amplification when used with some modulation schemes, such as time-interleaved pulse width modulation and spatially combined IQ modulation.

Figure 1:
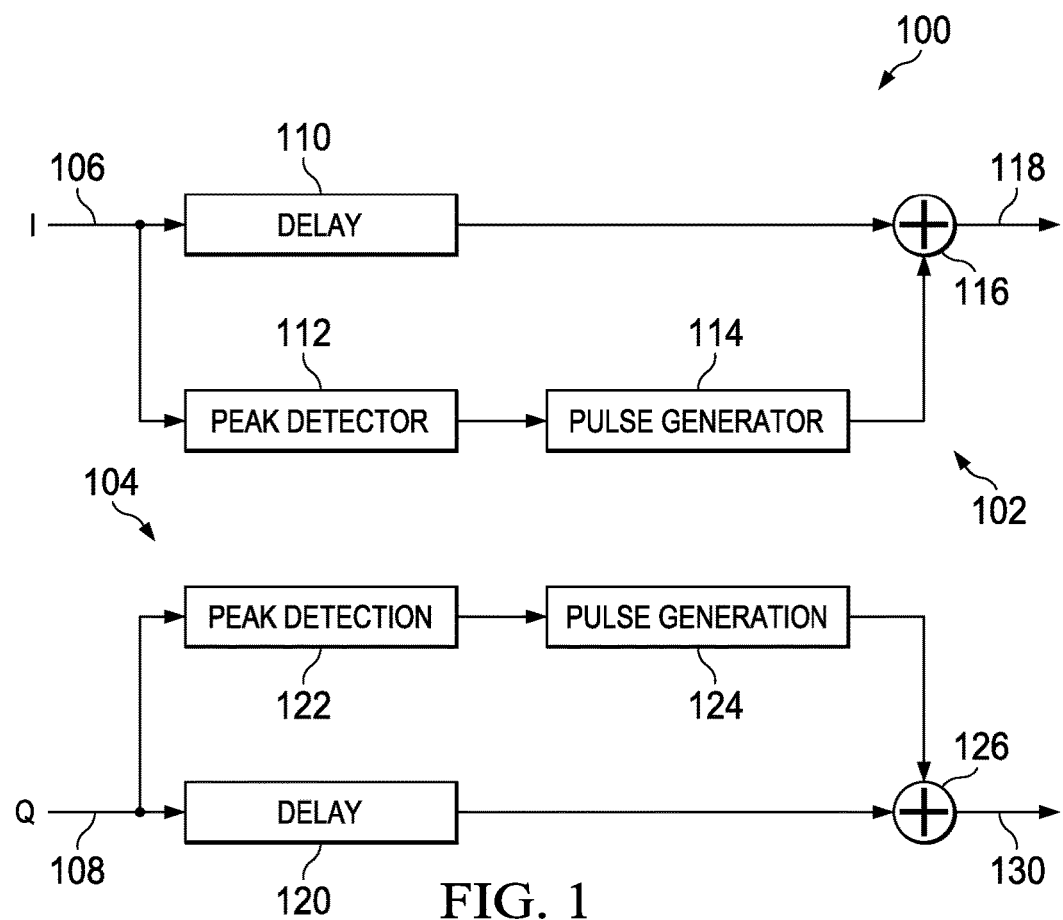
FIG. 1 is a block diagram of a circuit that performs crest factor reduction on I and Q signals independently.

A block diagram of a circuit 100 that performs crest factor reduction on I and Q components of a complex signal independently is shown in FIG. 1. The circuit 100 is divided into a first section 102 and a second section 104. The first section 102 is sometimes referred to as the I component processing circuit and processes the I component of the complex signal. The second section 104 is sometimes referred to as the Q component processing circuit and processes the Q component of the complex signal. The I and Q components are sometimes referred to as the first and second components of the signal.

The circuit first section 102 has in input 106 for the I component and the second section 104 has an input 108 for the Q component. The first section 102 will be described followed by a description of the second section 104, which is substantially identical to the first section 102. The input 106 is split so that the I component is fed to a delay 110 and a peak detector 112. As described in greater detail below, the peak detector 112 detects peaks in the I component. In one embodiment, the peak detector 112 generates a signal in response to the peak detector 112 detecting that a peak in the I component exceeds a first predetermined threshold. The output of the peak detector 112 is coupled (e.g., connected) to a pulse generator 114, which generates a signal to reduce the peak amplitude of the I component. In some embodiments, the pulse generator 114 is a signal generator that generates the signal for reducing the peak of amplitude of the I component. The output signal of the pulse generator 114 is sometimes referred to as a second signal. The output of the delay 110 and the output of the pulse generator 114 are connected to an adder 116 that subtracts the signal generated by the pulse generator 114 from the delayed I component as described in greater detail below. The output of the summer 116 is the output 118 for the first section 102 of the circuit 100.

The input 108, which is the input for the Q component in the second section 104, is connected to devices that are substantially identical to the devices used in the first section 102. The input 108 is connected to a delay 120 and a peak detector 122. In one embodiment, the peak detector 112 generates a signal in response to the peak detector 112 detecting that a peak in the Q component exceeds a second predetermined threshold (e.g., which may be unequal to the first predetermined threshold). The output of the peak detector 122 is connected to a pulse generator 124, which generates a signal to reduce the peak amplitude of the Q component as described below. In some embodiments, the pulse generator 124 is a signal generator that generates the signal for reducing the peak of amplitude of the Q component. The output signal of the pulse generator 124 is sometimes referred to as a third signal. Both the output of the delay 120 and the output of the pulse generator 124 are connected to an adder 126 that adds both signals so as to reduce the peak in the Q component in response to its peak exceeding the above-described threshold. The output of the adder 126 is the output 130 of the second section 104 of the circuit 100. In some embodiments, the gain of the I and Q components can be adjusted after the summers 116, 126.

Figure 2:
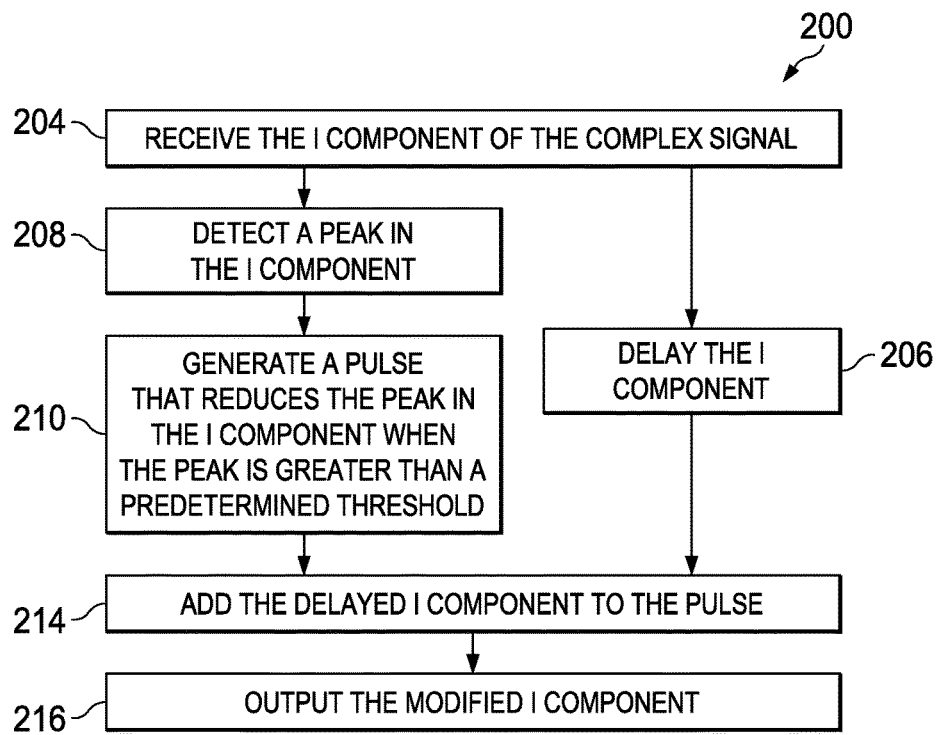
FIG. 2 is a flow chart describing the operation of the first section of the circuit of FIG. 1.

The operation of the circuit is now described in conjunction with the flow chart 200 of FIG. 2. The circuit 100 operates by receiving the I and Q components of a complex signal as shown in step 204 of FIG. 2. In one embodiment, the circuit 100 processes the I and Q components separately from one another, yet in a parallel (e.g., substantially concurrent) manner. The I component is processed by the first section 102 of the circuit 100 and the Q component is processed by the second section 104 of the circuit 100.

Processing the I component commences with receiving the I component as shown at step 204. The I component is received at the delay 110 and the peak detector 112. The delay 110 delays the I component per block 206 and as described below. The peak detector 112 detects whether peaks in the I component exceed a predetermined value as shown in block 208. In response to the peak detector 112 detecting that such peaks exceed the predetermined value, the peak detector 112 causes the pulse generator 114 to generate a pulse that reduces the peak of the I component per block 210. The pulse generated by the pulse generator 114 may have substantially the same spectral components as the I component for effective reduction of the peak of the I component.

The pulse generated by the pulse generator 114 is added to the delayed I component from the delay 110 by the adder 116 as shown in block 214. In the embodiment of FIG. 1, the time delay provided by the delay 110 is equal to the amount of time required by the peak detector 112 and the pulse generator 114 to perform their functions. The result is that the I component and the pulse to reduce its peak or crest arrive at the adder 116 at substantially the same time. The modified I component of the complex signal is output per block 216 on the output 120.

Figure 3:
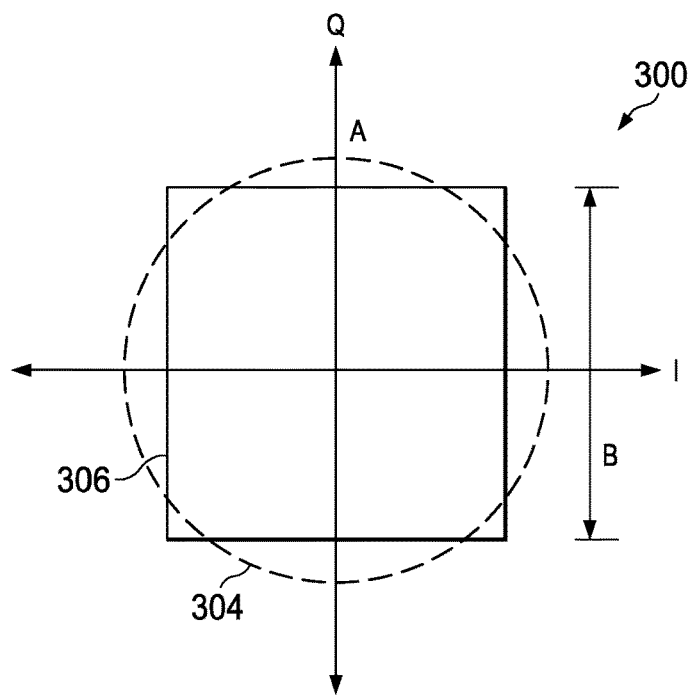
FIG. 3 is a graph showing the difference in constellation patterns between the circuit of FIG. 1 and conventional crest reduction circuits.

By reducing the crests of the I and Q components individually, the constellation area of the error vector magnitude (EVM) becomes square instead of round as it would be with conventional crest reduction where the I and Q components are reduced together in the complex signal. A graph 300 showing the difference between the constellation patterns is shown in FIG. 3. The conventional constellation pattern 304 is shown by the dashed circle, which is sometimes referred to as the circular constellation pattern 304. The circular constellation pattern 304 is the result of conventional peak reduction schemes reducing the I and Q components together. A square constellation pattern 306 is shown by the square in FIG. 3. The circular constellation pattern 304 has a radius A and the square constellation pattern 306 has sides with lengths B. The square constellation pattern 306 enables greater suppression of the peaks of the I and Q components than with conventional suppression methods as described below while maintaining similar EVM numbers.

In the conventional cancellation schemes, the I and Q components are cancelled or reduced together. In the case of pulses, the conventional cancellations of the I and Q components are shown by equations (1) and (2) as follows:

$$cp_I(n+N_{PL}) = -x_I(N_{PL})\left[1 - \frac{A}{\sqrt{x_I(N_{PL})^2 + X_Q(N_{PL})^2}}\right]h_{NSF}(n),$$ Equation (1)

$$-M \leq n \leq M$$

$$cp_Q(n+N_{PL}) = -X_P(N_{PL})\left[1 - \frac{A}{\sqrt{x_I(N_{PL})^2 + X_Q(N_{PL})^2}}\right]h_{NSF}(n),$$ Equation (2)

$$-M \leq n \leq M$$

where $N_{PL}$ is the peak location, A is the clipping threshold, $h_{NSF}(n)$ is the normalized cancellation pulse with $h_{NSF}(0)=1$, and 2M+1 is the length of the cancellation pulse. The cancellation using equations (1) and (2) cancels all peaks that are greater than the threshold A as shown by the circular constellation 304 of FIG. 3. The circuit 100 described herein cancels the I and Q components individually, which yields the constellation 306 as described below.

The cancellation pulses for the I and Q components in the circuits and methods described herein are shown by equations (3) and (4) as follows:

$$cp_I(n+N_{PL}) = -x_I(N_{PL})\left[1 - \frac{B}{x_I(N_{PL})}\right]h_{NSF}(n),$$ Equation (3)

$$-M \leq n \leq M$$

$$cp_Q(n+N_{PL}) = -x_Q(N_{PL})\left[1 - \frac{B}{x_Q(N_{PL})}\right]h_{NSF}(n),$$ Equation (4)

$$-M \leq n \leq M$$

where B is the new clipping threshold. It is noted that the respective thresholds may be different for the I and Q components.

The operation of the circuit 100 is described below based on orthogonal frequency-division multiplexing (OFDM). The OFDM enables modulation on multiple carrier frequencies. In OFDM, the distribution of the complex signal containing the I and Q components follows a circular complex Gaussian distribution because it is the summation of a large number of carriers modulated by random data. The Gaussian distribution follows a Rayleigh distribution p(r) as shown by equation (5):

$$p(r) = \frac{r}{\sigma^2}e^{\left(-\frac{r^2}{2\sigma^2}\right)}$$ Equation (5)

Where $r=abs(I^2+Q^2)$ and I and Q are Gaussian distributed with a mean of zero and a variance of $\sigma^2$. As stated above, in conventional peak cancellation methods, the peaks are cancelled equally for both the I and Q components, which results in the EVM being uniform. For further analysis of peak cancellation, the peak average power ratio (PAPR) is calculated as follows:

$$PAPR = \frac{\max(I^2 + Q^2)}{E|I^2 + Q^2|}$$ Equation (6)

Because the I and Q signals are independent but processed together with the circular constellation pattern 304, the PAPR may be written as shown by equation (7):

$$PAPR = \frac{A^2}{2\sigma^2}$$ Equation (7)

It follows that the PAPR of the individual I and Q components is twice that of equation (7) or:

$$PAPR = \frac{A^2}{\sigma^2}$$ Equation (8)

Based on equations (7) and (8), it can be seen that the PAPR of the individual I and Q components is twice that of the combined PAPR. Accordingly, the PAPR of the individual I and Q components is 3 dB higher than the combined PAPR.

The circuit 100 performs peak detection and cancellation on the individual I and Q components, which yields the square constellation pattern 306 of FIG. 3. The square constellation pattern 306 enables greater suppression of the individual I and Q components by suppressing the I and Q components individually in the complex signal. For the same EVM numbers, areas of the constellations 304 and 306 are the same or substantially the same, and the threshold of B, related to the circuit 100, can be expressed by the following equation:

$$(2B)^2 = \pi A^2 \quad \text{Equation (9)}$$

The threshold of B is therefore expressed as:

$$B = \frac{\sqrt{\pi}}{2} A \quad \text{Equation (10)}$$

When equation (10) is related to equation (6), the PAPR is defined as:

$$PAPR = \frac{\max(I^2 + Q^2)}{E|I^2 + Q^2|} = \frac{2B^2}{2\sigma^2} = \frac{B^2}{\sigma^2} \quad \text{Equation (11)}$$

It follows that the PAPR of individual I and Q components is the same as equation (11) because of the square constellation pattern 306. Therefore, the desired result of a smaller PAPR for the I and Q components is achieved.

An example of the peak cancellation is provided for a 10 MHz 64 QAM LTE (quadature amplitude modulation; long term evolution) signal wherein the initial PAPR of the complex signal is 11.67 dB. The conventional crest factor reduction may result in 9 dB PAPR on I and Q components with −23 dB EVM. When the above-described crest factor reduction was run, the result was an 8.3 dB PAPR on the I and Q components with the same EVM number. In using the above-described crest factor reduction, it may be necessary to adjust gains in the first and second sections 102, 104 as stated above after the I and Q components pass through the summers 116, 126. The gain adjustment is used to maintain substantially the same average power for the I and Q components before and after peak cancellation. Another possible approach for maintaining average power is to maintain the phase angle of original complex signal while clipping the constellation to be inside a square.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method of crest factor reduction in a first signal having I and Q components, the method comprising:
    delaying the I component;
    detecting that a peak in the I component exceeds a predetermined threshold;
    determining an amplitude of the I component at the peak in the I component;
    in response to detecting that the peak in the I component exceeds the predetermined threshold, generating a second signal such that an amplitude of the second signal is a function of the determined amplitude of the I component at the peak in the I component, and such that the amplitude of the second signal is independent of an amplitude of the Q component of the first signal; and
    reducing an amplitude of the peak in the I component in response to detecting that the peak in the I component exceeds the predetermined threshold,
    in which reducing the amplitude of the peak in the I component includes adding the second signal to the delayed I component.

2. The method of claim 1, in which delaying the I component includes delaying the I component for a period that includes a time of: generating the second signal in response to detecting that the peak in the I component exceeds the predetermined threshold.

3. The method of claim 1, in which generating the second signal includes generating the second signal having a frequency spectrum for reducing the amplitude of the peak in the I component.

4. The method of claim 1, in which generating the second signal includes generating the second signal for reducing the amplitude of the peak in the I component, without affecting the Q component.

5. The method of claim 1, in which the predetermined threshold is a first predetermined threshold, the method including:
    delaying the Q component;
    detecting that a peak in the Q component exceeds the second predetermined threshold;
    determining an amplitude of the Q component at the peak in the Q component;
    in response to detecting that the peak in the Q component exceeds the second predetermined threshold, generating a third signal such that an amplitude of the third signal is a function of the determined amplitude of the Q component at the peak in the Q component, and such that the amplitude of the third signal is independent of the amplitude of the I component of the first signal; and
    reducing an amplitude of the peak in the Q component in response to detecting that the peak in the Q component exceeds the second predetermined threshold,
    in which reducing the amplitude of the peak in the Q component includes adding the third signal to the delayed Q component.

6. The method of claim 5, in which delaying the Q component includes delaying the Q component for a period that includes a time of: generating the third signal in response to detecting that the peak in the Q component exceeds the predetermined threshold.

7. The method of claim 5, in which generating the third signal includes generating the third signal having a frequency spectrum for reducing the amplitude of the peak in the Q component.

8. The method of claim 5, in which generating the third signal includes generating the third signal for reducing the amplitude of the peak in the Q component, without affecting the I component.

9. A circuit for reducing an amplitude of a first signal having first and second components, the circuit comprising:
    a peak detector for detecting whether a peak in the first component exceeds a predetermined threshold;
    a signal generator coupled to the peak detector for determining an amplitude of the first component at the peak in the first component, and in response to the peak detector detecting that the peak in the first component exceeds the predetermined threshold, generating a second signal such that an amplitude of the second signal is a function of the determined amplitude of the first component at the peak in the first component, and such that the amplitude of the second signal is independent of an amplitude of the second component of the first signal; and
    an adder coupled to the signal generator for reducing an amplitude of the peak in the first component, in which reducing the amplitude of the peak in the first component includes adding the second signal to the first component.

10. The circuit of claim 9, in which the first component is an I component of the first signal.

11. The circuit of claim 9, in which the first component is a Q component of the first signal.

12. The circuit of claim 9, including circuitry for delaying the first component for a period that includes a time of: generating the second signal in response to the peak detector detecting that the peak in the first component exceeds the predetermined threshold.

13. The circuit of claim 9, in which the signal generator is a pulse generator.

14. The circuit of claim 9, in which the peak detector is a first peak detector, the signal generator is a first signal generator, the adder is a first adder, and the predetermined threshold is a first predetermined threshold, and including:
a second peak detector for detecting whether a peak in the second component exceeds a second predetermined threshold;
a second signal generator coupled to the second peak detector for determining an amplitude of the second component at the peak in the second component, and in response to the second peak detector detecting that the peak in the second component exceeds the second predetermined threshold, generating the third signal such that an amplitude of the third signal is a function of the determined amplitude of the second component at the peak in the second component, and such that the amplitude of the third signal is independent of an amplitude of the first component of the first signal; and
a second adder coupled to the second signal generator for reducing an amplitude of the peak in the second component, in which reducing the amplitude of the peak in the second component includes adding the third signal to the second component.

15. The circuit of claim 9, in which generating the second signal includes generating the second signal having a frequency spectrum for reducing the amplitude of the peak in the first component.

16. The circuit of claim 9, in which generating the second signal includes generating the second signal for reducing the amplitude of the peak in the first component, without affecting the second component.

17. The circuit of claim 12, including circuitry for delaying the first component for a period that includes a time of: detecting whether the peak in the first component exceeds the predetermined threshold.

18. The circuit of claim 14, including circuitry for delaying the second component for a period that includes a time of: generating the third signal in response to the second peak detector detecting that the peak in the second component exceeds the second predetermined threshold; and detecting whether the peak in the second component exceeds the second predetermined threshold.

19. The circuit of claim 14, in which the second signal generator is a pulse generator.

20. A method of crest factor reduction in a first signal, the method comprising:
receiving first and second components of the first signal;
delaying the first component;
detecting that a peak in the first component exceeds a first predetermined threshold;
determining an amplitude of the first component at the peak in the first component;
in response to detecting that the peak in the first component exceeds the first predetermined threshold, generating a second signal such that an amplitude of the second signal is a function of the determined amplitude of the first component at the peak in the first component, and such that the amplitude of the second signal is independent of an amplitude of the second component of the first signal;
reducing an amplitude of the peak in the first component in response to detecting that the peak in the first component exceeds the first predetermined threshold;
delaying the second component;
detecting that a peak in the Q component exceeds a second predetermined threshold;
determining an amplitude of the second component;
in response to detecting that the peak in the second component exceeds the second predetermined threshold, generating a third signal such that an amplitude of the third signal is a function of the determined amplitude of the second component at the peak in the second component, and such that the amplitude of the third signal is independent of the amplitude of the first component of the first signal; and
reducing an amplitude of the peak in the second component in response to detecting that the peak in the second component exceeds the second predetermined threshold,
in which reducing the amplitude of the peak in the first component includes adding the second signal to the delayed first component, and in which reducing the amplitude of the peak in the second component includes adding the third signal to the delayed second component.

21. The method of claim 20, in which the first component is an I component of the first signal, and in which the second component is a Q component of the first signal.

22. A circuit for crest factor reduction in a first signal having first and second components, the circuit comprising:
circuitry for delaying the first and second components;
a first peak detector for detecting whether a peak in the first component exceeds a first predetermined threshold;
a first signal generator coupled to the first peak detector for determining an amplitude of the first component at the peak in the first component, and in response to the first peak detector detecting that the peak in the first component exceeds the first predetermined threshold, generating a second signal such that an amplitude of the second signal is a function of the determined amplitude of the first component at the peak in the first component, and such that the amplitude of the second signal is independent of an amplitude of the second component of the first signal;
a first adder coupled to the first signal generator for reducing an amplitude of the peak in the first component, in which reducing the amplitude of the peak in the first component includes adding the second signal to the delayed first component;
a second peak detector for detecting whether a peak in the second component exceeds a second predetermined threshold;
a second signal generator coupled to the second peak detector for determining an amplitude of the second component at the peak in the second component, and in response to the second peak detector detecting that the peak in the second component exceeds the second predetermined threshold, generating a third signal such that an amplitude of the third signal is a function of the determined amplitude of the second component at the peak in the second component, and such that the amplitude of the third signal is independent of an amplitude of the first component of the first signal; and a second adder coupled to the second signal generator for reducing an amplitude of the peak in the second component, in which reducing the amplitude of the peak in the second component includes adding the third signal to the delayed second component.

23. The circuit of claim 22, in which the first component is an I component of the first signal, and in which the second component is a Q component of the first signal.

\* \* \* \* \*